E. O. COLLINS.
DEMOUNTABLE RIM FOR WHEEL TIRES.
APPLICATION FILED JAN. 16, 1915.
1,141,935.
Patented June 8, 1915.
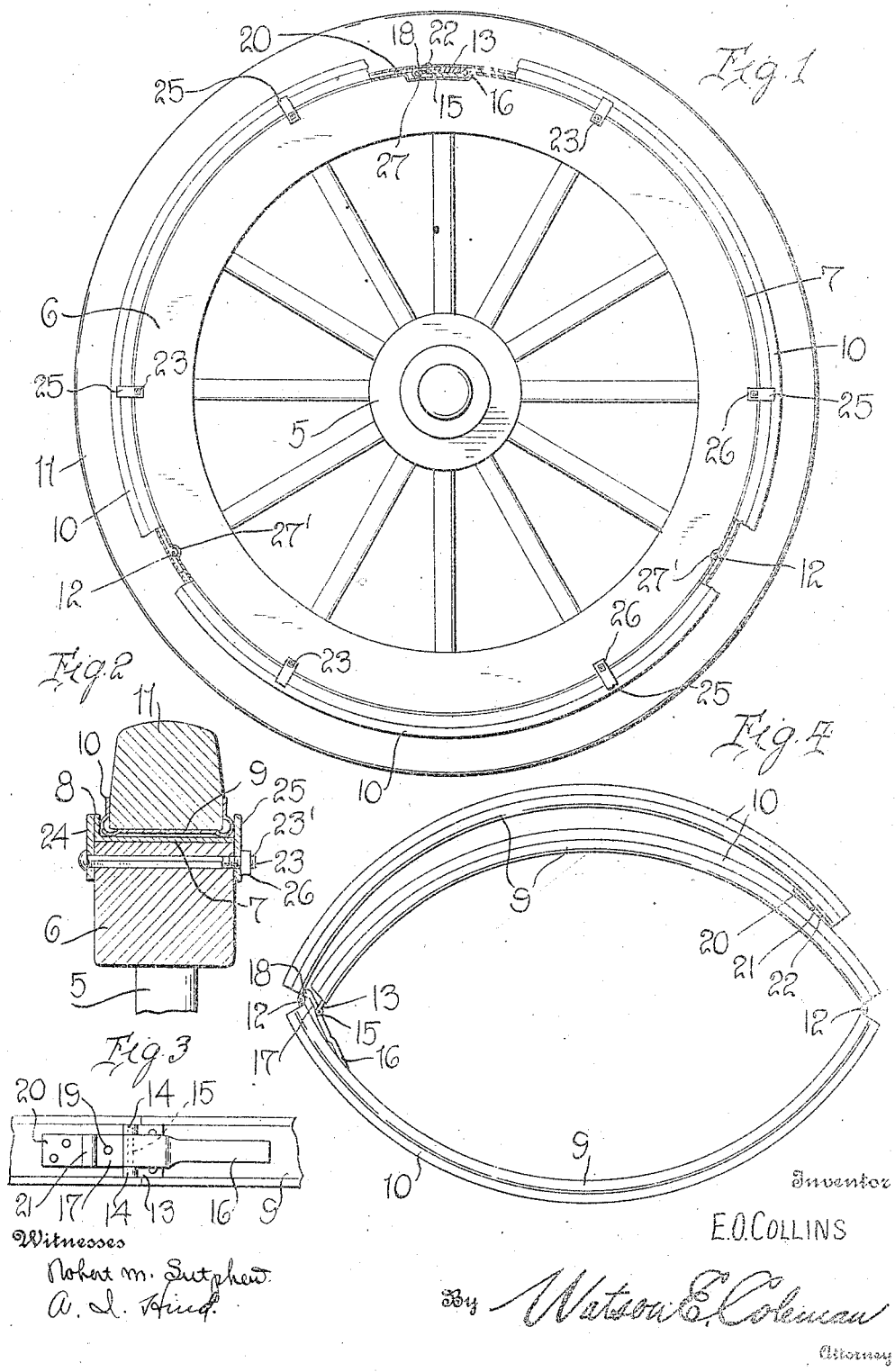
Witnesses
Robert M. Sutphen
A. L. Hind
Inventor
E. O. Collins
By Watson E. Coleman
Attorney

UNITED STATES PATENT OFFICE.

ELBA O. COLLINS, OF CHILLICOTHE, OHIO.

DEMOUNTABLE RIM FOR WHEEL-TIRES.

1,141,935.  Specification of Letters Patent.  Patented June 8, 1915.

Application filed January 16, 1915. Serial No. 2,664.

*To all whom it may concern:*

Be it known that I, ELBA O. COLLINS, a citizen of the United States, residing at Chillicothe, in the county of Ross and State of Ohio, have invented certain new and useful Improvements in Demountable Rims for Wheel-Tires, of which the following is a specification, reference being had to the accompanying drawings.

This invention relates to demountable rims for wheel tires, and has for its primary object to provide a rim of this type embodying a plurality of relatively movable sections whereby the rim may be compactly folded so that the same will occupy only a small space in the body of the machine, when not in use.

The invention has for one of its objects to provide a simple and novel fastening device for holding the rim sections against relative movement when the tire is arranged thereon.

It is a further general object of the invention to provide an improved demountable rim for wheel tires, which is light in weight, strong and serviceable in practical use, and capable of manufacture at relatively small cost.

With the above and other objects in view, my invention consists in the novel features of construction, combination and arrangement of parts to be hereinafter more fully described, claimed, and illustrated in the accompanying drawing, in which, Figure 1 is an outer side elevation, partly in section, showing my improved demountable rim applied to a wheel; Fig. 2 is an enlarged transverse section; Fig. 3 is a fragmentary interior plan view of the rim, showing the latching device; and Fig. 4 is a side elevation showing the several sections of the rim folded.

Referring in detail to the drawing, 5 designates the wheel having the usual felly 6.

7 designates the continuous annular felly band which is adapted to be arranged upon the periphery of the felly, said band being provided upon one edge with an outstanding flange 8. This metal felly band 7 is of a width approximately equal to the width of the wheel felly and is secured thereon against lateral movement with respect to the felly, in a manner to be hereinafter set forth.

The improved demountable rim which forms the subject matter of the present application, embodies a series of curved sheet metal sections 9, of channel-shaped form in cross-section, said rim sections having the outstanding flanges 10 formed upon their longitudinal edges, said flanges being preferably inwardly crimped or bent to exert a clamping pressure upon the rubber tire, indicated at 11. While I have shown a solid rubber tire in the accompanying drawing, it will be understood that, if desired, a pneumatic tire may be employed. Preferably, three of the rim sections 9 are used, the end sections being connected to the opposite ends of the intermediate section, by means of hinges indicated at 12. When the rim is not in use, the two end sections thereof are folded inwardly upon each other and disposed in opposed relation to the intermediate section, as shown in Fig. 4.

To the extremity of one of the end sections of the rim, a plate 13 is secured, which is formed with the spaced knuckles 14. Upon a pintle 15, engaged in these knuckles, a latch lever 16 is loosely engaged for pivotal movement. The comparatively short end portion 17 of this lever, which projects beyond the end of the rim section, terminates in a cylindrical enlargement 18; and adjacent thereto, the end portion of the lever is provided with an opening 19. Upon the other end section 9 of the rim, adjacent to its free end, the keeper member 20 is riveted or otherwise secured, said member being provided upon one end with a curved lip 21 upon the concave face of which the enlarged end 18 of the pivoted lever is adapted to engage. A pin or stud 22 is also secured to this latter end section of the rim, adjacent to the lip 21, and is adapted to be received in the opening 19 of the latch lever, whereby the rim sections are securely held against relative circumferential movement.

In applying the collapsible or foldable rim, the same is arranged within the annular tire 11 in the folded condition shown in Fig. 4, and the two end sections are then separated, and all of the sections of the rim moved into engagement against the inner surface of the tire which is received between the longitudinal flanges 10. As the end sections of the rim are moved into engagement with the tire, the enlarged end 18 of the latch lever is engaged with the lip 21, and the opposite end of said lever forced outwardly against the face of the rim section upon which it is mounted. The lever thus acts to expand the two rim sections and cause the same to tightly engage with the rubber tire and exert an outward pressure thereon. After the tire has been secured upon my improved rim in this manner, the rim is inserted from the outside of the wheel over the metal band 7, which is arranged upon the wheel felly, until the rim sections abut against the outstanding flange 8 on the inner edge of said felly band. The band 7 and the rim upon which the rubber tire is mounted, are then secured upon the wheel felly by means of a series of bolts, indicated at 23. These bolts extend transversely through the felly 6 of the wheel and are provided with rectangular portions to prevent their turning movement. The extremities of the bolts are cylindrically formed and screw threaded, as indicated at 23', said threaded ends projecting outwardly from the wheel felly. Upon the rectangular portions of these bolts, the clamping plates or lugs 24 are arranged adjacent to the bolt heads. These plates engage upon the inner face of the wheel felly and upon the flange 8 of the annular felly band 7. It will be apparent that the clamping plates or lugs 24 are prevented, by the rectangular portions of the bolts, from turning thereon. Similar clamping plates 25 are also arranged upon the outer cylindrical ends 23' of the several bolts, said latter plates being provided with circular openings to loosely receive said bolts. Nuts 26 are threaded upon the ends 23' of the bolts to securely clamp the latter plates 25 against the outer face of the wheel felly, the edge of the band 7 and the outer flanges of the several rim sections 9. Thus, it will be apparent that all of the parts are securely held against lateral shifting movement with respect to each other or with relation to the wheel upon which they are mounted. The metal band 7 is provided with recesses or seats in its body, as shown at 27 and 27', to receive the latching device above referred to, and the hinges 11, respectively. By the provision of these seats in the metal band, turning or circumferential movement of the demountable rim upon said band, is prevented; and wear, consequently upon friction between these parts, is thus eliminated.

From the foregoing description, taken in connection with the accompanying drawing, it is thought that the construction, manner of use, and several advantages of my invention, will be clearly and fully understood. The device, as a whole, is of very simple construction, and by providing the rim in a series of relatively movable sections, it will be appreciated that the same is of great convenience in practical use, in that it admits of a number of the rims being compactly folded and arranged in a comparatively small space in the vehicle body. My improved tire rim may be very easily and quickly arranged in position for use and the tire engaged thereon, and by the provision of the latching device above described, the several sections will be positively held against any relative movement after the tire has been applied to the wheel.

While I have illustrated a particular form of the hingedly connected rim sections in the accompanying drawing, it is to be understood, of course, that the form of these sections may be variously altered to adapt the device for use in connection with pneumatic or solid rubber tires of any desired cross-sectional configuration. The device is also susceptible of a great many modifications in the form, proportion, and arrangement of the several elements employed, and I, therefore, reserve the privilege of resorting to all such legitimate changes as may be fairly embodied within the spirit and scope of the invention as claimed.

Having thus fully described my invention, what I desire to claim and secure by Letters Patent is:—

1. A demountable rim for wheel tires including a plurality of hingedly connected metal rim sections adapted for relative movement whereby the same may be engaged against the inner side of the tire, a latch lever pivotally mounted upon the extremity of one section, a keeper secured upon the extremity of the opposed rim section and provided with a curved lip to receive one end of said lever, said lever being provided adjacent to its latter end and between the same and its pivot with an opening, and an inwardly projecting stud fixed to the latter rim section for engagement in said opening to positively hold the rim sections against relative circumferential movement.

2. A demountable rim for wheel tires including a plurality of hingedly connected rim sections adapted to be engaged against the inner face of the wheel tire, a latch lever pivotally mounted upon the extremity of one of the rim sections and having a cylindrically formed terminal, a keeper member fixed to the extremity of the opposed rim section and provided with a curved lip to receive the cylindrical extremity of the latch lever, and additional means on the latter rim section to coöperate with the lever and positively prevent relative circumferential movement of the rim sections.

In testimony whereof I hereunto affix my signature in the presence of two witnesses.

ELBA O. COLLINS.

Witnesses:
M. C. LYDDANE,
D. W. GAIL.